3,299,115
PREPARATION OF BIS(TRICHLOROETHYL) CARBONATE

Harry W. Weber, Jr., Baltimore County, Md., assignor to FMC Corporation, New York, N.Y., a corporation of Delaware
No Drawing. Filed June 26, 1963, Ser. No. 290,585
2 Claims. (Cl. 260—463)

This invention relates to the preparation of bis(trichloroethyl) carbonate, and more particularly, to the preparation of bis(2,2,2-trichloroethyl) carbonate in high yield in an aqueous medium.

Dialkyl carbonates, such as dimethyl and diethyl carbonates, are conventionally prepared by reacting the anhydrous alcohol with phosgene, either stepwise through the intermediate chloroformate, or in a single-step reaction. However, this synthesis is not suitable for the preparation of bis(2,2,2-trichloroethyl) carbonate in high yield.

It is an object of this invention to provide a method of preparing bis(2,2,2-trichloroethyl) carbonate.

It is another object to provide an economical method of preparing bis(2,2,2-trichloroethyl) carbonate in high yield.

These and other objects will become apparent from the following description of this invention.

I have now discovered that bis(2,2,2-trichloroethyl) carbonate can be prepared in high yield by reacting 2,2,2-trichloroethanol, phosgene, and an alkali metal hydroxide in an aqueous medium. Yields of about 93% of substantially pure product are readily obtained by this process. It is quite surprising that bis(2,2,2-trichloroethyl) carbonate can be prepared in an aqueous medium since the presence of water is known to be quite detrimental to the yield in the synthesis of other dialkyl carbonates.

The reaction of this invention is carried out by mixing 2,2,2-trichloroethanol, phosgene, and an alkali metal hydroxide in an aqueous medium at room temperature or below. It is advantageous to use temperatures below room temperature to minimize hydrolysis of phosgene, trichloroethanol and reaction product by the action of aqueous caustic. Preferably, the reaction is carried out at temperatures of about 0–15° C., although temperatures up to about room temperature can be used, if desired. Pressure has no significant effect upon the reaction. For convenience, atmospheric pressure is preferred, although higher or lower pressures may be employed, if desired.

Any alkali metal hydroxide may be used in this reaction. Suitable examples include sodium, potassium and lithium hydroxides. Sodium hydroxide is preferred for economic reasons.

Although the reaction takes place in the presence of any ratio of trichloroethanol, phosgene, and caustic, good yields are obtained when approximately stoichiometric amounts (two moles of trichloroethanol and two moles of hydroxide for each mole of phosgene) are used, while best results are obtained by using an excess of caustic and phosgene, such as 1–1.5 moles of hydroxide and 0.5–0.75 mole of phosgene per mole of trichloroethanol. The amount of water present should be at least sufficient to dissolve the by-product sodium chloride, while the maximum amount is governed by practical considerations, such as the increase in reaction time and reaction volume resulting from dilution of the reactants. Preferably, about 1–20 parts by weight of water are used for each part of trichloroethanol.

The following examples, illustrating the novel process disclosed herein for preparing bis(2,2,2-trichloroethyl) carbonate, are presented without any intention that the invention be limited thereto. All percentages are by weight.

Example 1

A solution of 28 g. (0.50 mole) of potassium hydroxide in 600 g. of water was cooled with stirring to 5° C., and 74 g. (0.50 mole) of 2,2,2-trichloroethanol was added uniformly over a 15-min. period, while the temperature was maintained at 5–8° C. using a cooling bath. The temperature was reduced to 0–5° C. and maintained within these limits while 25 g. (0.25) mole of liquid phosgene was added uniformly over a 17-min period. Bis(trichloroethyl) carbonate precipitated as a flocculent white solid throughout the addition of phosgene. At the end of this addition, the pH of the liquid phase was 8.5 and a few additional drops of phosgene were added, after which the pH dropped to 7. After warming the slurry to 30° C., the product was isolated by filtration and dried at 100 mm./Hg and 70° C. The product was 67 g. of bis(2,2,2-trichloroethyl) carbonate, corresponding to an 84% yield based on trichloroethanol, initially having a capillary melting point of 88–89° C., and after sublimation, 89.0–89.5° C.

Example 2

A solution of 20 g. (0.50 mole) of sodium hydroxide in 600 g. of water was cooled with stirring to 5° C., and 74 g. (0.50 mole) of 2,2,2-trichloroethanol was added uniformly over a 15-min. period, while the temperature was maintained at 5–8° C. using a cooling bath. The temperature was reduced to 0–5° C., and maintained within these limits while 25 g. (0.25 mole) of liquid phosgene was added uniformly over a 17-min. period. An additional 4 g. of sodium hydroxide was then added, followed by an aditional 5 g. of phosgene. The final pH of the liquid phase was 6. After warming the slurry to 30° C., the product was isolated by filtration and dried at 100 mm./Hg and 70° C. A 93% yield of bis(2,2,2-trichloroethyl) carbonate was obtained, based on trichloroethanol charged. The capillary melting point of the product was 89–90° C., and the chlorine content was 65.55% (theoretical: 65.49%).

As will be apparent to those skilled in the art, numerous modifications and variations of the embodiments illustrated above may be made without departing from the spirit of the invention or the scope of the following claims.

I claim:
1. A method of preparing bis(2,2,2-trichloroethyl) carbonate which comprises reacting 2,2,2-trichloroethanol, phosgene, and an alkali metal hydroxide in an aqueous medium at room temperature or below.
2. The method of claim 1 in which 0.5–0.75 mole of phosgene and 1.0–1.5 moles of alkali metal hydroxide are reacted with each mole of trichloroethanol at a temperature of 0–15° C.

References Cited by the Examiner

UNITED STATES PATENTS

| | | | |
|---|---|---|---|
| 938,132 | 10/1909 | Einhorn | 260—463 |
| 1,957,908 | 5/1934 | Philipp | 260—463 |
| 2,370,566 | 2/1945 | Muskat | 260—463 X |
| 2,758,975 | 8/1956 | Cottle | 260—463 X |
| 3,017,424 | 1/1962 | Meyer | 260—463 |

FOREIGN PATENTS 108,328   10/1958   Pakistan.

CHARLES B. PARKER, *Primary Examiner.*

F. D. HIGEL, *Assistant Examiner.*